US006535105B2

(12) United States Patent
Heistand, II et al.

(10) Patent No.: US 6,535,105 B2
(45) Date of Patent: Mar. 18, 2003

(54) ELECTRONIC DEVICE AND PROCESS OF MAKING ELECTRONIC DEVICE

(75) Inventors: Robert H. Heistand, II, Myrtle Beach, SC (US); John L. Galvagni, Surfside, SC (US); Jeffrey P. Mevissen, Conway, SC (US); Robert Moffatt Kennedy, III, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 09/810,829

(22) Filed: Mar. 16, 2001

(65) Prior Publication Data

US 2001/0035810 A1 Nov. 1, 2001

Related U.S. Application Data

(60) Provisional application No. 60/193,276, filed on Mar. 30, 2000.

(51) Int. Cl.[7] ................................................. H01C 1/02
(52) U.S. Cl. ..................... 338/226; 338/307; 338/309; 338/332; 29/610.1
(58) Field of Search ................................. 338/226, 307, 338/309, 332, 328, 327, 20, 21; 29/610, 610.1, 620, 621

(56) References Cited

U.S. PATENT DOCUMENTS 4,331,715 A * 5/1982 Wolpert ....................... 427/240
4,453,199 A * 6/1984 Ritchie et al. .............. 361/306
5,002,807 A    3/1991 Fujimura et al.

(List continued on next page.)

FOREIGN PATENT DOCUMENTS

SE        1482587        8/1977

OTHER PUBLICATIONS

Robert H. Heistand, BCB: Planar and Simple, Penton Publishing, Inc., Cleveland, Ohio, 1992, No Month.

W.C. McDougall, S. Farling, R. Schick, S. Glukh, S.K. Jayaraman, L.F. Rhodes, R. Vicari, Avatrel™ Dielectric Polymers for HDP Applications, pp. 17–20, International Conference on High Density Packaging and MCMs, 1999, No Month.

David A. Horsma, Frank W. Mercer, Multichip Module Made From Flare™: A New Low Dielectric Constant, Moisture Insensitive Polymeric Thin Film Dielectric, ISHM '91 Proceedings, No Month.

David R. Clarke, Varistor Ceramics, pp. 485–501, J. Am. Ceram. Soc., 1999, No Month.

Morita Makoto, Laminated Electronic Component, Jun. 5, 1997, Japan.

(List continued on next page.)

*Primary Examiner*—Elvin Enad
*Assistant Examiner*—Kyung S. Lee
(74) *Attorney, Agent, or Firm*—Dority & Manning, P.A.

(57) ABSTRACT

An electronic device and process of making the device is disclosed. The device includes a multi-sided body defined by a plurality of electrode plates arranged in a stack. A resin layer is applied to both conductive and semiconductive regions of the device, and metal is plated upon terminals to create a conductive element. The device may be a varistor, thermistor, resistor, or other microelectronic component having a multi-sided body and terminal structures that are capable of receiving a resin coating. The multi-sided body has a resin coating on at least a portion of an exterior surface, the resin coating substantially preventing plating of metal onto the exterior surface of the body. One suitable resin coating that may be employed is a thermoset resin comprising a B-staged divinylsiloxane-bis(benzocyclobutene)(i.e. "BCB") resin dissolved in mesitylene solvent.

28 Claims, 4 Drawing Sheets

U.S. PATENT DOCUMENTS

| | | | |
|---|---|---|---|
| 5,339,068 A | * | 8/1994 | Tsunoda et al. ............ 338/332 |
| 5,369,390 A | | 11/1994 | Lin et al. |
| 5,614,074 A | * | 3/1997 | Ravindranathan ............ 205/50 |
| 5,750,264 A | * | 5/1998 | Ueno et al. ................. 428/426 |
| 5,841,190 A | | 11/1998 | Noda et al. |
| 5,854,302 A | | 12/1998 | Foster et al. |
| 5,879,572 A | | 3/1999 | Folsom et al. |
| 5,882,836 A | | 3/1999 | Foster et al. |
| 5,952,911 A | * | 9/1999 | Kawase et al. ........... 338/22 R |
| 5,968,847 A | | 10/1999 | Ye et al. |
| 6,024,584 A | | 2/2000 | Lemke et al. |
| 6,071,800 A | * | 6/2000 | Shigemoto et al. ......... 438/612 |
| 6,079,991 A | | 6/2000 | Lemke et al. |
| 6,093,035 A | | 7/2000 | Lemke et al. |
| 6,164,983 A | | 12/2000 | Lemke et al. |

OTHER PUBLICATIONS

Kenneth Mason Publications, Electronics Uses of Benzocyclobutene, 451A–451B, XP002054087, Hampshire, GB. No date.

PCT International Search Report, International Application No. PCT/US01/09299, Applicant: AVX Corporation. No date.

* cited by examiner

ELECTRONIC DEVICE AND PROCESS OF MAKING ELECTRONIC DEVICE

REFERENCE TO PREVIOUS APPLICATION

This application claims priority from previously filed Provisional Application No. 60/193,276 filed on Mar. 30, 2000.

BACKGROUND OF THE INVENTION

This invention relates generally to multilayer electronic devices used in the electronics industry.

The manufacture of small electronic components such as varistors, resistors, thermistors and the like requires numerous processing steps. Several different methods are employed to provide devices capable of storing electrical energy on a circuit board. After the microelectronic devices are constructed, manufacturers attach such devices to circuit boards at high speed using soldering techniques.

In soldering such electronic devices to circuit boards, the devices must have readily solderable end terminations. Electroplating metal upon the end terminations of such devices, without also plating metal upon the resistive or semiconductive bodies of such devices, is a challenge facing the industry. Manufacturers must apply metal upon only those portions of the device upon wherein they wish to impart conductivity, and seek to avoid unintentionally imparting metal to other poorly conductive portions of such devices. Separating conductive portions from semiconductive portions is sometimes very difficult in devices that are only a few hundredths of an inch wide.

Many microelectronic devices are so small as to be barely discernible to the human eye. Thus, it is usually not possible to apply metal plating to only certain preselected portions of the device by mechanically directing solder to such locations, as may be pursued in the manufacture of larger electronic components. Instead, other techniques are necessary to electroplate metal upon only certain predetermined portions of the electronic device, while avoiding electroplating metal upon other portions of the device that are designed to be nonconductive.

Several United States patents discuss the application of resin or polymeric coatings to relatively large, flat, silicon wafers. Further, other patents describe the application of resins to wafers by spin coating to form circuit boards. Etching is often used to remove resin from preselected portions of the wafer.

Resin coatings may be applied to the two-dimensional surface of a wafer. U.S. Pat. No. 5,879,572 (which is hereby incorporated by reference) is directed to the application of divinylsiloxane (DVS) bisbenzocyclobutene (BCB) as a coating to a silicon wafer. The method includes a subsequent step of etching the wafer to remove the coating from the surface of the wafer at the specific locations where it is desired to facilitate conductivity upon the wafer.

U.S. Pat. No. 5,882,836 (hereby incorporated by reference) describes the application of a photocurable formulation of partially polymerized DVS resin by spin coating the resin upon the relatively large, flat surface of a substrate or wafer to make a circuit board. A coating of 10–12 microns thick is applied by spinning the circuit board wafer a high rpm, followed by a soft bake cycle. Then, a pattern of light is applied to the surface of the wafer by striking the DVS resin on the surface of the wafer, forming a patterned circuit board with conductive and nonconductive areas on the surface of the board.

U.S. Pat. No. 5,854,302 (incorporated herein by reference) is directed to a process for forming a partially polymerized DVS resin comprising heating DVS monomer in a solvent at a concentration of DVS monomer to render the resin photocurable.

Application of resins, followed by selective removal of resins from only certain portions of microelectronic devices, is a difficult, time consuming and expensive procedure. Thus, in the manufacture of microelectronic devices, a device and process for applying resin that does not require selective removal from a portion of the device to form conductive and nonconductive portions is desirable. Thus, a process that is capable of applying resin to a microelectronic device on all portions of the device, but still enables a device having both conductive and nonconductive portions, without selective removal of resin, is highly desirable.

Devices to be resin coated which are only a few hundredths of an inch wide present special problems. Such devices are sometimes no larger than a grain of sand. A process that is capable of applying resin to such devices in mass production quantities, while still allowing recovery of excess resin, is desirable.

SUMMARY OF THE INVENTION

The invention of this application may be presented in many different embodiments, and representative embodiments are described herein. The invention is not limited to only those embodiments described below, and a person of skill in the art may readily apply the invention in other ways that are apparent from this specification.

The invention comprises an electronic device having a multi-sided body defined by a plurality of electrode plates arranged in a stack. Additionally, a plurality of terminal structures are electrically connected to said electrode plates in a predetermined manner, the terminal structures having interior and exterior layers. In general, the multi-sided body and the terminal structures are capable of receiving a resin coating. The body has a resin coating applied upon at least a portion of an exterior surface, the resin coating substantially preventing plating of metal onto the exterior surface of the body. Further, the terminal structures contain at least one metal plating layer on their exterior surface. A metal plating layer typically is affixed to the resin coating on the terminal structures in such a manner as to allow conductivity by displacing the surface portion of the coating during the plating process. The polymer usually remains in the termination pores and on the ceramic surface of the component.

One advantage of the resin application of this invention is that deployment of the invention may prevent undesirable plating upon the main body of the microelectronic device, while still facilitating plating upon the end terminations. Furthermore, there usually is no need for selective removal of the thermoset resin from any portion of the electronic device. The resin usually is applied to all portions of the device. Selective removal, which is difficult and costly in the manufacture of microelectronic devices of very small size, can be substantially avoided using this invention.

The electronic devices to which this invention may be applied include, but are not limited to varistors, thermistors, resistors, and other semiconductor devices. In most applications, the polymeric coating is cured by crosslinking. A polymer or resin may comprise any resin capable of curing into a resistant coating. In one embodiment of the invention, the resin may be a thermoset resin. In some applications, the resin coating comprises an aromatic cyclic compound. In one embodiment of the invention, the electronic device is a varistor. At least one layer of the metal plating applied to the end terminations may be comprised of nickel or a nickel alloy. In another embodiment, the metal plating is comprised of an alloy containing tin, such as a tin/lead alloy. In general, any metal platings commonly used in the microelectronics industry may be employed in the practice of this invention.

In one application of the invention, the resin coating applied to the overall device fills voids existing on the surface of the multi-sided body, or in the end termination glass frit. The filling of such voids increases the resistance of the microelectronic device to subsequent entrapment of moisture or other foreign substances in the voids. This can serve to increase reliability in the operation of the electronic device when it is subjected to high temperature and/or high humidity conditions. Unintended entrapment of metal or moisture into voids may cause an electronic component to rupture when it is subjected to reflow soldering and the like at relatively high temperatures. Thus, in one embodiment of the device, the terminal structures comprise void spaces that are substantially filled with thermoset resin prior to plating.

One embodiment of the invention employs a varistor comprising a multi-sided body defined by a plurality of electrode plates arranged in a stack. The varistor also includes a plurality of dielectric layers between the electrode plates. Further, a plurality of terminal structures are electrically connected to the electrode plates in a predetermined manner, the terminal structures having interior and exterior layers. The outer or exterior layers of the terminal structure also may comprise at least two layers of metal plated onto the terminal structures. The multi-sided body of the varistor, and the terminal structures, generally are capable of receiving a resin coating, the resin coating comprising a benzocyclobutene (BCB). Typically, the metal is plated over the resin coating in such a manner as to allow for conductivity by displacing the surface portion of the coating during the plating process. The polymer remains in the termination pores and on the ceramic surface of the component. The multi-sided body of the varistor may have a coating of BCB on at least a portion of an exterior surface. The BCB coating substantially prevents plating of metal onto the surface of the body, but does not interfere with plating upon the terminal structures. The terminal structures may comprise a metal plating layer of a tin alloy applied on the exterior surface and a metal plating layer of nickel applied on top of the BCB coating. The metal plating is affixed to the terminal structures, but usually is not affixed to the multi-sided body of the varistor.

In one aspect of the invention, a process of making an electronic device is shown, comprising several steps. First, a multi-sided body is provided having on its interior a plurality of stacked electrode plates. Next, one or more terminals are electrically connected to said electrode plates, the terminals having void spaces on their outer surface. This can be facilitated by vacuum impregnation to force material into the voids. N a next step, the electronic device is coated on all sides with a thermoset resin. This can be facilitated by vacuum impregnation to force material into the voids.

In one aspect of the invention, it is possible to plate multiple layers of dissimilar metals upon the terminals. Depending upon the identity of the resin employed, the process also may include crosslinking the thermoset resin during the curing step. Crosslinking may be by any means, including thermal, e-beam, plasma, or by light (ultraviolet to visible).

In one embodiment of the invention, the coating step comprises removing excess thermoset resin from the electronic devices by centrifugal force. The process also may include removing excess resin from the microelectronic devices by placing the electronic devices in a centrifuge, and applying centrifugal force.

In one aspect of the invention, the thermoset resin employed is a benzocyclobutene (BCB) thermoset resin. The process also may include filling void spaces with resin during the coating step on the outer surface of the terminals prior to plating metal upon the terminals. This may serve to prevent undesirable entrapment of moisture, salts or foreign debris into void spaces, which can cause rupture of terminations during later application of the device to a circuit board at high reflow solder temperatures. The invention also may include a surface mount device (SMD) made by the process described above.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Each embodiment below is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

This invention has application to any microelectronic devices that are small and must be electroplated with metal upon only selected predetermined portions of the microelectronic device. One device that can benefit from this invention is a varistor, but resistors, thermistors, and other microelectronic devices also can be constructed using techniques of this invention.

In one aspect of the invention, zinc oxide varistors based on multilayer ceramic technology are employed. Such devices, referred to as multilayer varistors (MLVs), are generally constructed having a plurality of ceramic-electrode layers arranged in a stack. During manufacture, the stacked layers are pressed and sintered to achieve a substantially unitary body. A varistor body is often rectangular in shape, with electrical terminations of opposite polarity provided along respective sides or at opposite ends. A single package may contain one varistor, or an array of multiple varistors.

Figure 1A:
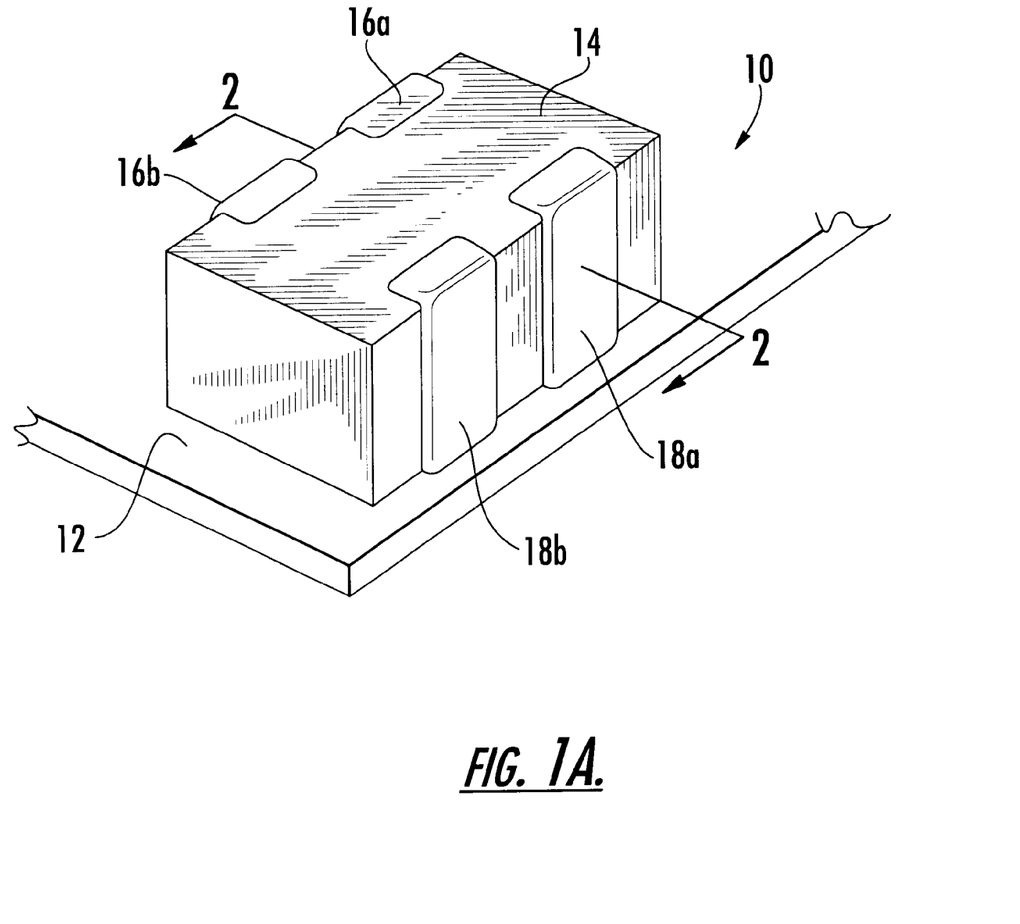
FIG. 1A is an enlarged perspective view of a surface mounted electronic device.

FIG. 1A illustrates a surface mount device (SMD) 10 mounted to a circuit board 12. This particular embodiment of the invention includes terminations along the sides of the device, but other embodiments can be employed with terminations at the end of the device. Device 10 includes a multi-sided body 14 of relatively small size. According to industry practice, the size of such devices may be expressed as a number "XXYY," with XX and YY being the length and width in hundredths of an inch. Using this convention, a typical size for multi-sided body 14 may be 0508. Smaller sizes are also common. A pair of terminations 16a-b are located on one side of body 14, with a second pair of terminations 18a-b being located on the opposite side of the multi-sided body 14.

Figure 1B:
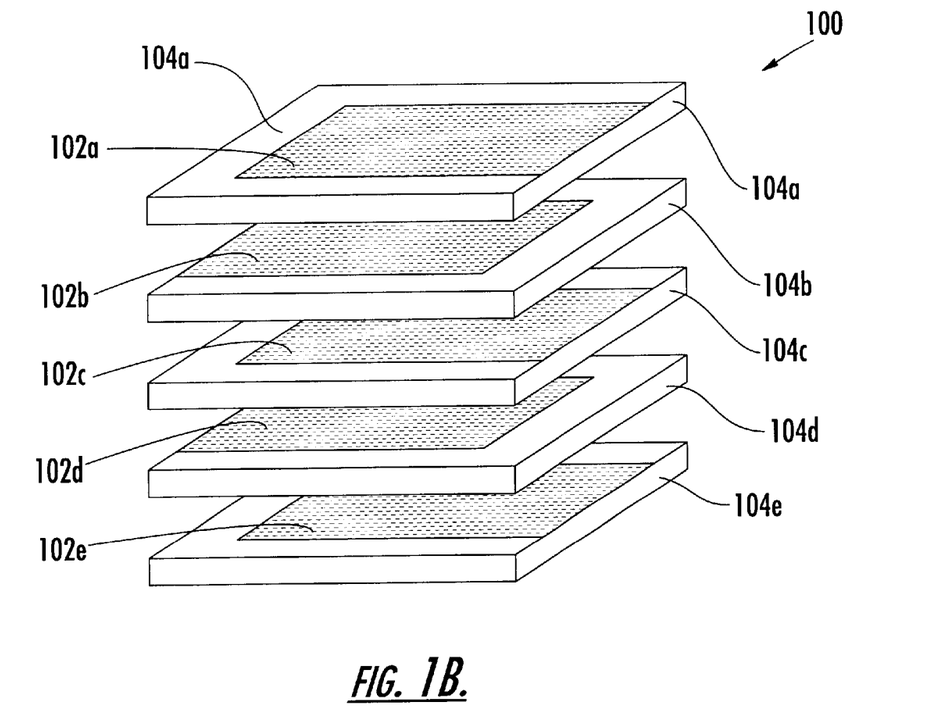
FIG. 1B is an exploded view of a portion of a standard surface mount device (SMD) chip.

FIG. 1B shows a standard surface mount device or chip 100 (also termed a "SMD" chip). Electrodes 102a-e are shown near the center of the chip, with margins of ceramic layers 104a-e surrounding each electrode, respectively.

Figure 1C:
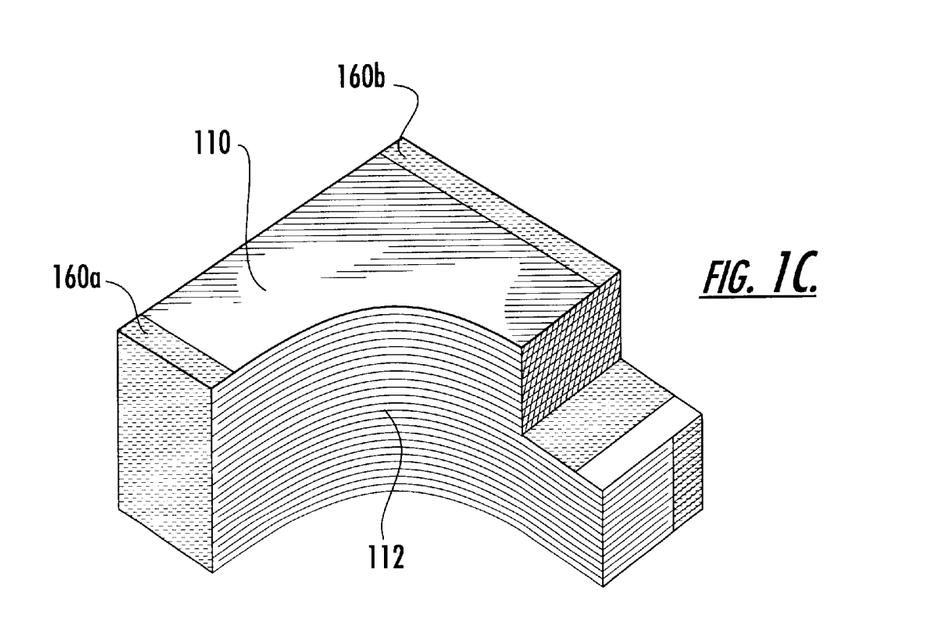
FIG. 1C is a perspective cut-away view of the SMD chip shown in FIG. 2.

FIG. 1C shows another view of an SMD chip similar to that shown in FIG. 1B. In FIG. 1C, terminations 160a and 160b are seen on each edge of the chip. Electrodes 112 are stacked. Dielectric ceramic 110 lies between the terminations 160a and 160b.

Figure 2:
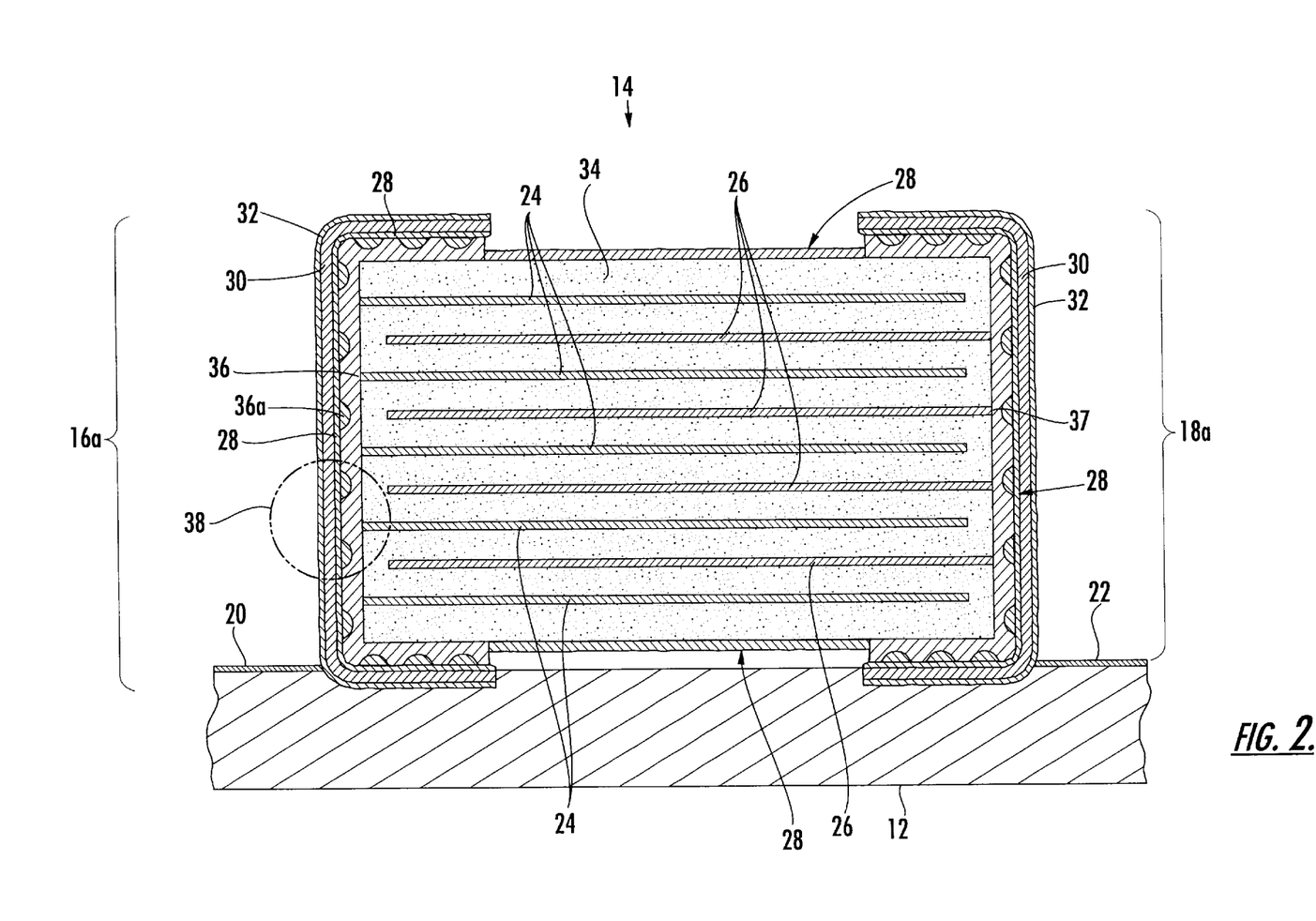
FIG. 2 shows a cross-sectional view of the electronic device taken along lines 2—2 of FIG. 1A.

The various terminations of the body 14 in FIG. 1A align with respective conductive paths or traces which are located on the surface of the circuit board 12 (traces are shown in FIG. 2). Electrical connection between each termination and its associated conductive path or trace may be effected by soldering the electronic device to the circuit board. Typically, a low temperature eutectic solder applied by wave or reflow soldering techniques may be utilized for this purpose, and a close-up view of the solder junction can be seen in FIG. 2.

FIG. 2 shows a cross-sectional view taken along lines 2—2 of FIG. 1A. Referring now to FIG. 2, the internal construction of multi-sided body 14 is shown. A plurality of parallel electrodes extend inwardly from each of the terminations so as to be interleaved with electrodes of an opposed termination. For example, electrode plates 24 extend inwardly from termination 16a. Electrode plates 26 extend inwardly from termination 18a so as to be interleaved with plates 24. The electrode plates are separated by layers of dielectric material 34.

Figure 3:
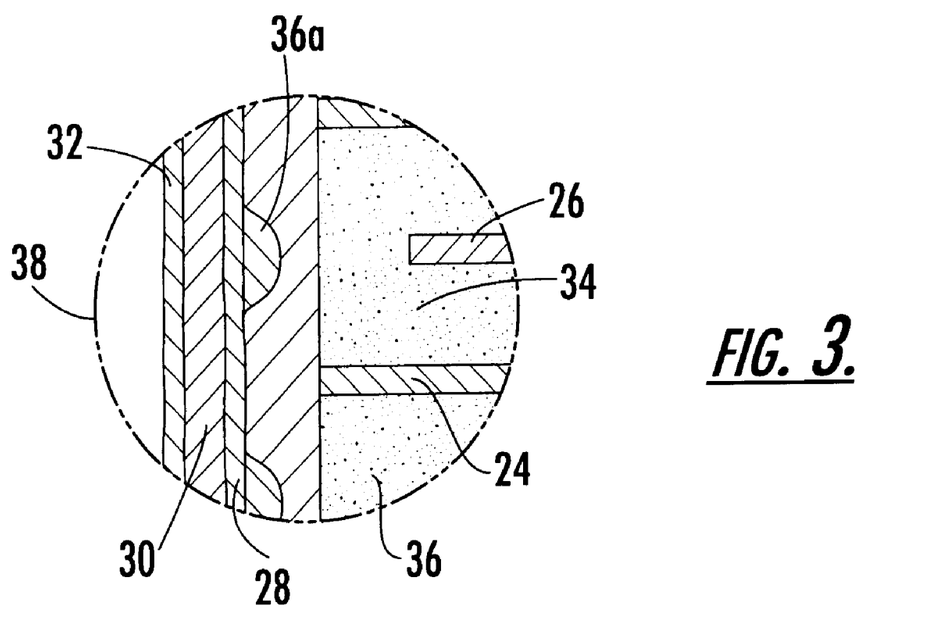
FIG. 3 depicts an enlarged magnified view of the circular inset 38, which is shown at the left side of FIG. 2, revealing a close-up view of the layers of the termination structure within the electronic device.

In FIG. 2, several layers may be seen on the terminal portion of the electronic device. Respective conductive silver coatings 36 and 37 containing glass frit may be applied to the end terminations 16a and 18a by dipping or striping, and then fired or heated to about 600–800 degrees C. to remove the organics and sinter the silver coating. Void spaces such as void space 36a may be present upon silver coatings 36 and 37. A polymeric or resin coating 28 may be applied to the device, as described in more detail below. As shown in FIG. 2 and FIG. 3, the void spaces 36a are filled with said resin coatinci 28.

Further, outside of the resin coating 28 are first metal plating layer 30 and a second metal plating layer 32. In one particular embodiment, first metal plating layer 30 may comprise a nickel alloy, and the second metal plating layer 32 comprises a tin or tin/lead alloy. In other embodiments, there may be only one metal plating layer. Still other embodiments may include three or more layers plated or applied on top of resin coating 28.

After the electronic device is completed, the metal plating layers 30 and 32 may be soldered to traces 20 and 22 on the surface of the board 12. This soldering procedure sometimes causes an electronic component to fail if water, moisture, salts, or other foreign matter has become undesirably trapped into pore spaces of the terminations underneath the metal plating layer. Thus, one function of the resin layer applied to the multi-sided device is to avoid such eruptions during multiple reflows of solder to temperatures as high as 350 degrees C. When coating the device with the resin coating, the pores become filled with resin, and therefore the resin occupies the void spaces 36 minimizing the likelihood that foreign matter will become trapped into the pore spaces and reducing the number of malfunctions.

FIG. 3 shows a detailed inset 38 seen on the left side of FIG. 2. Electrode plates 24 and 26 are seen within dielectric 34 at the right margin of FIG. 3. A silver/glass frit layer 36 is shown, and on the outside of the silver layer is a thin discontinuous resin coating 28 and first metal plating layer 30. A second metal plating layer 32 also is shown. Although more or less than two metal plating layers may be used in the invention, two metal plating layers have been found to be quite useful in the practice of the invention. Commonly, but not always, the first metal plating layer comprises a nickel alloy layer, and the second metal plating layer 32 comprises a tin or tin/lead alloy. In general, the resin must not detract from electrical contact with the silver/glass termination layer. It is important that resin coating 28 prevent plating on the resistive or semiconductive body if the body is not made of a non-conductive dielectric material.

In some embodiments, the electronic device 10 comprises a varistor that may include a metal-oxide based ceramic such as that used in ZnO varistors.

The resin may be applied to the multi-sided device by several methods, including spraying, dipping, immersion, sputtering, and ionization. However, one particularly useful method of applying thermoset resin to such microelectronic devices is by way of total immersion and vacuum impregnation, followed by separation of the multi-sided devices from the sticky and viscous resin solution using a centrifuge. Centrifugal force used in a typical commercial grade centrifuge is effective to remove excess resin from the devices, and this procedure conserves resin for re-use. In that way, environmental and chemical emission regulations are not offended.

Processing information at ever-increasing speeds in smaller packages requires electronic interconnects that cause minimal signal delay. Traditional printed circuitry is now yielding to complex multichip modules (MCM) fabricated via high-density multi-layer interconnect (HDMI) technology. These stacks of thin-film circuits feature improved signal propagation, increased signal speed, higher reliability, and miniaturization.

In addition, today's products such as hand-held phones, workstations, military and mainframe CPUs—are smaller, faster, and more sensitive to the effects of moisture and temperature. Therefore, thin-film coatings must have better dielectric properties, low moisture absorption, improved thermal stability, and good adhesion.

Numerous different types of coatings may be used in the application of this invention. Polyimide coatings can be employed. As another example, thermoset resins have been found to be particularly useful as applied in the invention. A thermoset resin is a high polymer resin that solidifies or sets irreversibly when heated. This property of setting is usually associated with a crosslinking reaction of the molecular constituents induced by heat or radiation. Curing agents such as organic peroxides may be added to cure the resin. Curing can occur by radiation or by chemical reaction. Phenolics, alkyds, amino resins, polyesters, epoxies, and silicones are all examples of thermosetting materials that could be employed in this invention, however, this list is not exhaustive of all the resins that could be employed.

One thermoset resin that may be advantageously employed in the invention of this application is a product known by the trade name CYCLOTENE®, which is manufactured and distributed by the Dow Chemical Co. of Midland, Mich. "CYCLOTENE" is a registered trademark of the Dow Chemical Company. CYCLOTENE is a divinylsiloxane bisbenzocyclobutene (DVS bis-BCB) polymer that can be employed as the resin layer 28 shown in FIGS. 2 and 3.

Thin-film coatings of DVS bis-BCB exhibit no more than about one-fifth the shrinkage of similar polyimide coatings, resulting in low stress and improved properties in the final multi-sided electronic components.

DVS bis-BCB polymer is derived from low viscosity B-staged bisbenzocyclobutene monomers, which cure by thermal rearrangement without catalysts. Significant by-products or volatiles can be avoided in most instances. DVS bis-BCB coatings may be rapid thermal processed (RTP) in about 3 minutes, including ramp up and ramp down time. Once cured, DVS bis-BCB is a hydrophobic polymer, absorbing only about 0.23% moisture after a 24-hr boil, compared to 0.4 to 0.5% for polyimides.

The low dielectric constant (2.7 to 10 kHz) of DVS bis-BCB remains relatively flat (from 1 kHz to 40 GHz) at temperatures from 150 to 250 degrees C., so it does not detract from the electronic parameters of the device.

To maximize device reliability, the thermal stability of a cured polymer dielectric must be in excess of the device processing and repair temperatures. With a glass transition temperature ($T_g$) in excess of 350 degrees C., DVS bis-BCB is stable in a nitrogen environment up to about 350 degrees C., which is well in excess of most fabrication and repair processes.

The ability of a thin-film coating to planarize topographical conductor features is important for the fabrication of reliable multilayer devices. Planarization may be defined as the ability of a coating to level "trenches and mesas" in a surface, or to fill pores or voids, without following the original contour of the surface. If this void filling function is accomplished correctly, the degree of planarization (DOP) is 100%, and voids are substantially filled. A non-planar surface increases the probability of undesirable shorts or open circuits.

DVS bis-BCB coatings provide optimum planarization when applied by immersion to the entirety of multi-sided electronic devices because of its low molecular weight and good flow characteristics before cure. In addition, the majority of solvent evaporates during the coating procedure, rather than during cure, which is desirable.

DVS bis-BCB coatings are heat cured under nitrogen, and have a wide processing window. Cycles may include: from several days at 170 degrees C., to several hours at 200 degrees C., to several seconds at 300 degrees C., resulting in a substantially uniform polymer structure as determined by infrared spectroscopy. Cure progress can be monitored using Fourier Transform Infrared (FT-IR) spectroscopy. Cured films of DVS bis-BCB exhibit very good resistance to photoresistant stripper, xylene, trichloroethane and isopropyl alcohol.

CYCLOTENE® resins include polymers that have been derived from B-staged bisbenzocyclobutene (BCB) monomers and have been developed for use in microelectronics applications. In general, CYCLOTENE® resins may be used in this invention for application to multi-sided microelectronic components which then may be incorporated into other electronic applications, including but not limited to the following: multichip modules, flat panel displays (e.g., planarization layers and high aperture dielectrics), interlayer dielectrics, micro-machines (e.g., sensors and mechanical devices), optical interconnects (e.g., waveguides and switches), and stress-buffer layers (e.g., logic and memory).

CYCLOTENE® resins have a relatively low dielectric constant (about 2.65), and provide a relatively low cure temperature, which can be as low as 200° C. for about two hours, depending upon the particular resin employed. These resins also exhibit relatively rapid thermal curing (less than 1 minute at 300° C. and about 1 hour at 250° C.). Further, they show a high solvent resistance, and are highly stable in the presence of most organic solvents, bases, and aqueous acids. The resins exhibit relatively low outgassing, which is generally undetectable below about 300° C.

After processing, the resin films are cured to ensure resistance to subsequent processing operations such as chemical baths, metallizations, and thermal cycling. This cure may be performed using a variety of tools, including: hotplates, convection ovens, vacuum ovens, tube furnaces, or reflow belt furnaces. The cure of films made from CYCLOTENE® resins is best carried out in the absence of oxygen (<100 ppm). This environment may be achieved by flowing nitrogen through a convection oven, tube furnace, or by using a vacuum oven. Box oven cures typically require 4–5 hours to complete, including heat up and cool down. The use of a belt furnace is an attractive alternative to the box oven for many applications because the parts may be cured in a continuous process and then immediately sent ahead to the next operation. In general, a hotplate temperature of approximately 300° C. can be used to fully cure the CYCLOTENE® films in less than one minute.

CYCLOTENE® resins may be soft cured between successive coats of the resin, if desired. The softcure procedure is used to enhance adhesion of subsequent layers deposited on top of the BCB film. It is recommended that the polymer reach 70–85% cure completion during the softcure process.

EXAMPLE 1

In the practice of the invention, electronic devices are fabricated, diced and sintered using methods known by persons of skill in the art. Then, terminations on the electronic devices are created by first applying silver/glass frit paste. The termination is then fired onto the device.

One advantageous method of resin application uses CYCLOTENE® 3022-35 in a 1:10 dilution of CYCLOTENE® to solvent. CYCLOTENE® 3022-35 is a B-staged divinylsiloxane-bisbenzocyclobutene, having polymerized 1,2-dihydro-2,2,4-trimethyl quinolines. The solvent used is T1100-Mesitylene (1,3,5-Trimethylbenzene), also available from Dow. The BCB concentration is 35%. The devices are prepared for complete immersion and vacuum impregnation in the resin. Immersion is followed by centrifuge separation of the excess CYCLOTENE® from the electronic devices, as further described below. The resin coating is then cured in a nitrogen atmosphere at about 250 degrees C. for about one hour. Following resin application, the devices are electroplated with standard commercially available processes.

EXAMPLE 2

In another embodiment of the invention, a different resin may be employed. As above, the electronic devices first are fabricated, diced and sintered using standard methods as provided in connection with Example 1 above. Then, terminations on the electronic devices are created by first applying silver/glass frit paste. The termination is then fired onto the device.

A coating of THERMID® is applied in the essentially the same manner as set forth above for Example 1. THERMID® is an acetylene-terminated polyimide oligomer composition manufactured and distributed by National Starch and Chemical Company of Bridgewater, N.J. THERMID® is believed to be a registered trademark of the National Starch and Chemical Company.

EXAMPLE 3

In still another embodiment of the invention, a different resin may be employed. As above, the electronic devices first are fabricated, diced and sintered using methods as provided in connection with Example 1 above. Then, terminations on the electronic devices are created by first applying silver/glass frit paste. The termination is then fired onto the device.

A resin FLARE® distributed by Raychem, an Allied Signal Company, is then applied in essentially the same manner as set forth in Example 1. ("FLARE" is believed to be a trademark of Raychem, an Allied Signal Company, of Menlo Park, Calif. 94025). FLARE is a low dielectric constant, moisture insensitive, nonpolyimide based polymeric thin film dielectric material. FLARE® has a dielectric constant of 2.62 at 0% RH which increases to 2.66 at 60% RH. FLARE® brand polymers are fluorinated poly(aryl ethers). A discussion of the properties and application of FLARE is shown in the article "Multichip Module Made From FLARE®: A New Low Dielectric Constant, Moisture Insensitive Polymeric Thin Film Dielectric" by Horsma and Mercer, presented at the ISHM 1991 Proceedings, which is hereby incorporated herein by reference.

EXAMPLE 4

In another embodiment of the invention, a different resin is employed. As above, the electronic devices first are fabricated, diced and sintered using methods as provided in connection with Example 1 above. Then, terminations on the electronic devices are created by first applying silver/glass frit paste. The termination is then fired onto the device.

The resin AVATREL®, which is manufactured and distributed by B. F. Goodrich, is applied in essentially the same manner, as set forth above in Example 1. ("AVATREL" is believed to be a trademark of the B. F. Goodrich Company of 9911 Brecksville Road, Cleveland, Ohio 44141). AVATREL® dielectric polymers are polynorbornenes (PNB's) with a bi-cyclic hydrocarbon backbone that provides a high glass transition temperature and very low moisture absorption. AVATREL® is discussed in "AVATREL®" Dielectric Polymers for HDP Applications" by W. C. McDougall et al., presented at the 1999 International Conference on High Density Packaging and MCM's, which is hereby incorporated herein by reference in its entirety.

It is to be understood by one of ordinary skill in the art that the present discussion is a description of exemplary embodiments only, and is not intended as limiting the broader aspects of the present invention, which broader aspects are embodied in the exemplary constructions.

What is claimed:

1. An electronic device, comprising:
   a multi-sided body having an exterior surface and defined by a plurality of electrode plates arranged in a stack;
   at least two terminal structures affixed to said multi-sided body, said terminal structures each being electrically conductive with at least one of said plurality of electrode plates;
   wherein said multi-sided body and said terminal structures further comprise a metal-free polymer coating;
   the multi-sided body having said metal-free polymer coating on its exterior surface, said metal-free polymer coating being resistant to plating of metal onto the exterior surface of said multi-sided body;
   said terminal structures comprising a metal plating layer on said exterior surface of said terminal structures, said metal-free polymer coating being positioned between said metal plating layer and said electrode plates, wherein said metal plating layer is affixed to said metal-free polymer coating on said terminal structures.

2. The electronic device as set forth in claim 1 wherein the metal-free polymer coating comprises a resin coating.

3. The electronic device of claim 2 in which the device is selected from the group of electronic devices comprising: varistors, thermistors, and resistors.

4. The electronic device of claim 2 in which the metal-free polymer coating is capable of being cured by crosslinking.

5. The electronic device of claim 2 in which the metal-free polymer coating comprises a thermoset resin.

6. The electronic device of claim 2 in which the polymer coating comprises an aromatic cyclic compound.

7. The electronic device of claim 2 in which the electronic device is a varistor.

8. The electronic device of claim 1 in which the metal plating layer is comprised of nickel.

9. The electronic device of claim 1 in which the metal plating layer is comprised of an alloy containing tin.

10. An electronic conductive device, comprising:
    a multi-sided body defined by a plurality of electrode plates arranged in a stack;
    a plurality of terminal structures having exterior surfaces, said terminal structures electrically connected to said electrode plates in a predetermined manner, the terminal structures having interior and exterior layers,
    wherein the multi-sided body and the terminal structures are capable of receiving a nonmetallic resin coating, the nonmetallic resin coating comprising a thermoset resin;
    the multi-sided body having a nonmetallic resin coating on at least a portion of an exterior surface, the nonmetallic resin coating preventing plating of metal onto the exterior surface of the multi-sided body; and
    the terminal structures comprising at least one metal plating layer on said exterior surfaces, wherein said metal plating layer upon said terminal structures is affixed to said nonmetallic resin coating.

11. The device of claim 10 in which the thermoset resin is a benzocyclobutene (BCB).

12. The device of claim 10 in which the terminal structures comprise at least two layers of metal plating.

13. The device of claim 12 in which one metal plating layer comprises nickel.

14. The device of claim 12 which one metal plating layer comprises a tin alloy.

15. The device of claim 12 in which a nickel layer and a tin layer are applied to the terminal structures.

16. The device of claim 10 in which the thermoset resin is a siloxane-containing resin.

17. The device of claim 10 in which the resin additionally comprises mesitylene as a solvent.

18. The device of claim 10 in which the terminal structures include void spaces, further wherein said void spaces are substantially filled with thermoset resin prior to plating.

19. An electronic device, comprising:
a multi-sided body defined by a plurality of electrode plates arranged in a stack;
a plurality of dielectric layers between said electrode plates;
a plurality of terminal structures electrically connected to said electrode plates in a predetermined manner, the terminal structures having interior and exterior layers;
wherein the multi-sided body and the terminal structures are capable of receiving a BOB resin coating;
the multi-sided body having a coating of BOB on at least a portion of an exterior surface, the BOB coating preventing plating of metal onto the surface of the body;
the terminal structures comprising:
   a metal plating layer of a tin alloy applied on the exterior surface, and
   a metal plating layer comprising nickel applied to the BCB coating,
the metal plating being affixed to the terminal structures, but not to the multi sided body.

20. A process of making an electronic device, comprising:
a) providing a multi-sided body having an interior defined by a plurality of electrode plates arranged in a stack;
b) providing a pair of opposed terminals, each of said terminals being electrically conductive with at least one of said electrode plates,
c) applying to said multi-sided body and said pair of opposed terminals a metal-free polymer coating;
d) curing said metal-free polymer coating; and
e) plating at least one metal plating layer upon said metal-free polymer coating at said pair of opposed terminals.

21. The process of claim 20 further comprising:
plating multiple layers of dissimilar metals upon the terminals.

22. The process of claim 20 wherein the metal-free polymer coating is crosslinked during the curing step.

23. The process of claim 20 in which the step (c) comprises soaking the electronic device in a solution containing metal-free polymer coating.

24. The process of claim 20 in which the step (c) comprises removing excess metal-free polymer coating from the electronic devices by applying centrifugal force.

25. The process of claim 20 in which excess metal-free polymer coating is removed by placing the electronic devices in a centrifuge.

26. The process of claim 20 in which the metal-free polymer coating is a benzocyclobutene.

27. (Amended) The process of claim 20 wherein the step (c) additionally comprises filling void spaces on the terminals prior to plating metal upon the terminals.

28. An electronic device made by the process of claim 20.

* * * * *

UNITED STATES PATENT AND TRADEMARK OFFICE
CERTIFICATE OF CORRECTION

PATENT NO.    : 6,535,105 B2                                          Page 1 of 1
DATED         : March 18, 2003
INVENTOR(S)   : Heistand, II et al.

It is certified that error appears in the above-identified patent and that said Letters Patent is hereby corrected as shown below:

<u>Column 11,</u>
Lines 11, 12 and 13, delete "BOB" and replace with -- BCB --.

Signed and Sealed this

Twenty-fifth Day of April, 2006

JON W. DUDAS
*Director of the United States Patent and Trademark Office*